US005540297A

United States Patent [19]
Meier

[11] Patent Number: 5,540,297
[45] Date of Patent: Jul. 30, 1996

[54] TWO-MOTOR WHEELCHAIR WITH BATTERY SPACE

[75] Inventor: Günther Meier, Porta Westfalica, Germany

[73] Assignee: Invacare (Deutschland) GmbH, Bad Oeynhausen, Germany

[21] Appl. No.: 343,931

[22] Filed: Nov. 17, 1994

[30] Foreign Application Priority Data

Jun. 15, 1994 [DE] Germany ............................ 44 20 877.4

[51] Int. Cl.$^6$ ................................ B60K 7/00; A61G 5/04
[52] U.S. Cl. ........................... 180/65.5; 180/6.5; 180/907
[58] Field of Search ..................................... 180/907, 6.48, 180/6.5, 65.5, 68.5; 280/250.1, 304.1, 711, 724, 726; 297/DIG. 4

[56] References Cited

U.S. PATENT DOCUMENTS

| | | | |
|---|---|---|---|
| 3,955,639 | 5/1976 | Cragg | 180/907 X |
| 4,022,483 | 5/1977 | Wallick et al. | 280/711 X |
| 4,344,643 | 8/1982 | Ray | 280/724 |
| 4,436,320 | 3/1984 | Brudermann et al. | 180/907 X |
| 4,593,929 | 6/1986 | Williams | 280/304.1 X |
| 4,671,524 | 6/1987 | Haubenwaller | 180/907 X |
| 4,805,712 | 2/1989 | Singleton | 180/907 X |
| 5,236,055 | 8/1993 | Legal | 180/907 X |
| 5,263,729 | 11/1993 | Watwood et al. | 280/250.1 X |

FOREIGN PATENT DOCUMENTS

| | | | |
|---|---|---|---|
| 0339500 | 11/1989 | European Pat. Off. | |
| 2269145 | 2/1994 | United Kingdom | 180/6.5 |
| 9005515 | 5/1990 | WIPO | 180/6.5 |

Primary Examiner—Eric D. Culbreth
Assistant Examiner—Victor E. Johnson
Attorney, Agent, or Firm—Browdy and Neimark

[57] ABSTRACT

A wheelchair for the disabled and sick in which two rear wheels (1) are each connected to an electric motor drive disposed on the rear axle (2) of each rear wheel (1) and each rear wheel is individually spring mounted in relation to the underframe (5) of the wheelchair by a spring member (6) which is coupled to the underframe (5) and the drive (3). A rocker identically configured for use on the right and left is mounted with its front end in a horizontal axis (8) on a longitudinal bar (9) of the underframe so as to be pivotable with respect to height, and with its rear longitudinal end the rocker is supported on the underframe longitudinal bar (9) and the spring member (6) coupled to the rocker (7). Drive (3 or 4) is attached to the rocker (7). Between the two rockers is a free space (FR) extending from the rear side of the wheelchair to the pivoting axes (8) of the rocker for easy insertion of a battery at the center of gravity.

12 Claims, 3 Drawing Sheets

TWO-MOTOR WHEELCHAIR WITH BATTERY SPACE

FIELD OF THE INVENTION

The invention relates to a wheelchair for the disabled and sick in which the two rear wheels are each connected to a respective electric motor drive and each rear wheel is independently sprung to an underframe of the wheelchair.

BACKGROUND OF THE INVENTION

The type of wheelchair to which the present invention relates is disclosed in EP 0 339 500, which shows a wheelchair with relatively bulky drives. Each drive is disposed on a wheel axle, and projects far into the space between the two side components of the wheelchair. The drives are rigidly connected by ball-and-socket joints extending transversely such that the access space for inserting the battery in the back of the wheelchair is very restricted, and the battery will not end up lying in the center of gravity of the wheelchair, which is undesirable.

SUMMARY OF THE INVENTION

Using this prior art as a point of departure, it is the object of the invention to equip the wheelchair with an improved spring-mounted bearing for each of the two driven rear wheels and also to provide between these two spring-mounting systems an easily accessible holding space for a battery which is to be inserted at the center of gravity of the wheelchair.

It is further the object of the invention to drive the rear wheels by means of a thin driving motor, which allows for a large free space to be created between the sides of the wheelchair.

Accordingly, the present invention contemplates for spring mounting each rear wheel of the wheelchair a pivotable rocker, which pivotably engages side bars on the underframe of the wheelchair, with the rear wheel and the driving motor simultaneously mounted on the rocker such that each driven rear wheel is kept individually spring mounted on the underframe. Shock absorbing spring members are employed between the rocker and the underframe.

Due to the separate spring mounting arrangement of the driven rear wheels, they correct any unevenness in the road surface independently of one another and thus remain in constant contact with the road surface. This results in a smooth operation of the wheelchair and allows for precise steering. The person using the wheelchair thus gains security in driving, and the spring mounting between the driven wheels and the underframe of the wheelchair ensures an optimal ride.

The rockers for use on the right and the left side are identical, so only one type of rocker is required.

The rockers extend obliquely backward and downward in the opposite direction of travel and their mounting point on the underframe is positioned relatively far forward. The use of these two rockers and the shock absorber allow the prior-art ball-and-socket joint bars which extend transversely and which were commonly used until now, to be dispensed with. This omission makes the holding space for the battery easily accessible from the rear of the wheelchair. The battery may be inserted relatively far toward the front in this holding space, such that it lies in the wheelchair's center of gravity and there helps to ensure a safe ride of the wheelchair.

This holding space is made still more easily accessible by the configuration of the drive as a gearless, flatly-built, electrical driving motor, which almost completely engages the rim of the rear wheel and thus projects between the two rockers without taking away space.

The rocker may be manufactured in an economical manner from one piece of aluminum. At its front end it is provided with an angled sleeve-shaped holder for the bearings of the pivoting axis on the underframe, and at the rear end with a plurality of bearing holders for alternative left-hand and right-hand use and the attachment of shock absorbers and a supporting wheel.

DETAILED DESCRIPTION OF THE PREFERRED EMBODIMENT

In the following specification and claims, directions are referenced to a wheelchair on a horizontal surface, such that "forward" means in the direction a seated occupant faces, and so on in like manner for "left", "right", and "rear."

Figure 1:
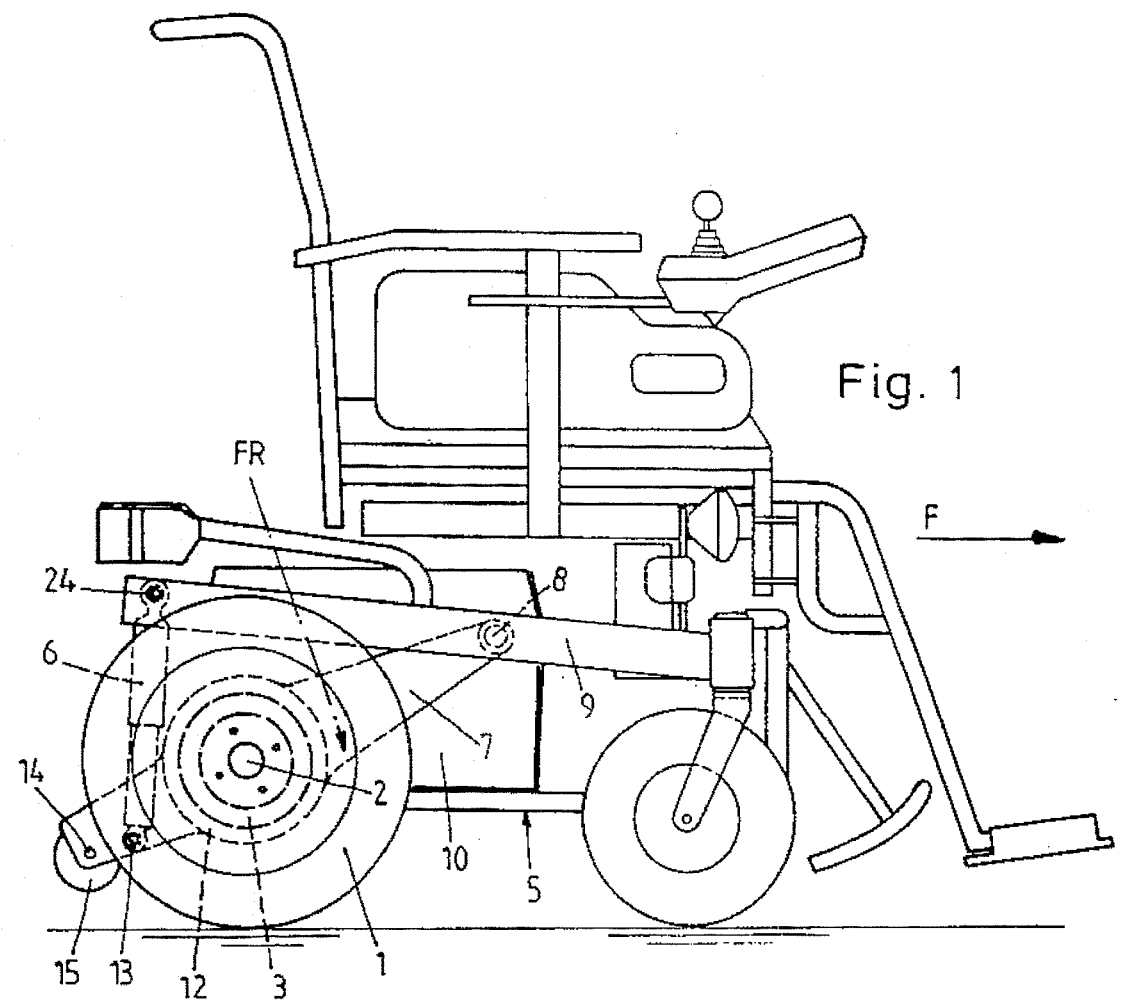
FIG. 1 is an elevational view of the side of the wheelchair of the present invention.

FIG. 1 is an overview of the present invention, a wheelchair for the disabled and sick. Two rear wheels (1) are each connected with an electric motor drive (3) which is disposed on the wheel axle (2) and each rear wheel (1) is individually spring mounted in relation to the wheelchair underframe (5) by means of a spring member (6) coupled to the underframe (5) and the drive (3/4).

Figure 4:
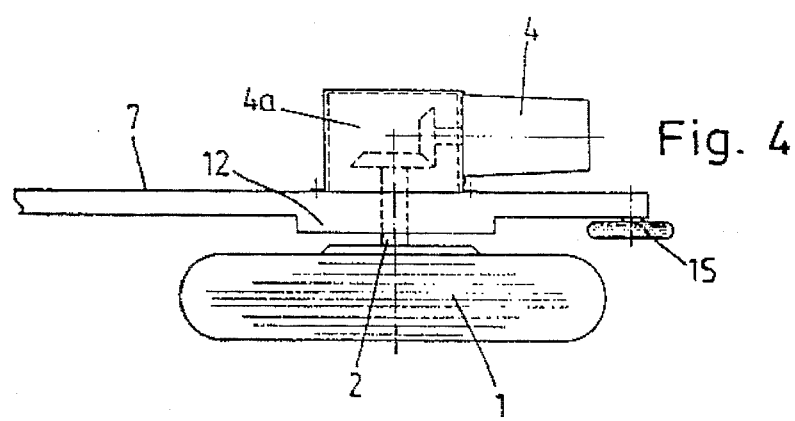
FIG. 4 is a plan view of an alternative embodiment of the rockers with bevel gears.
Figure 2:
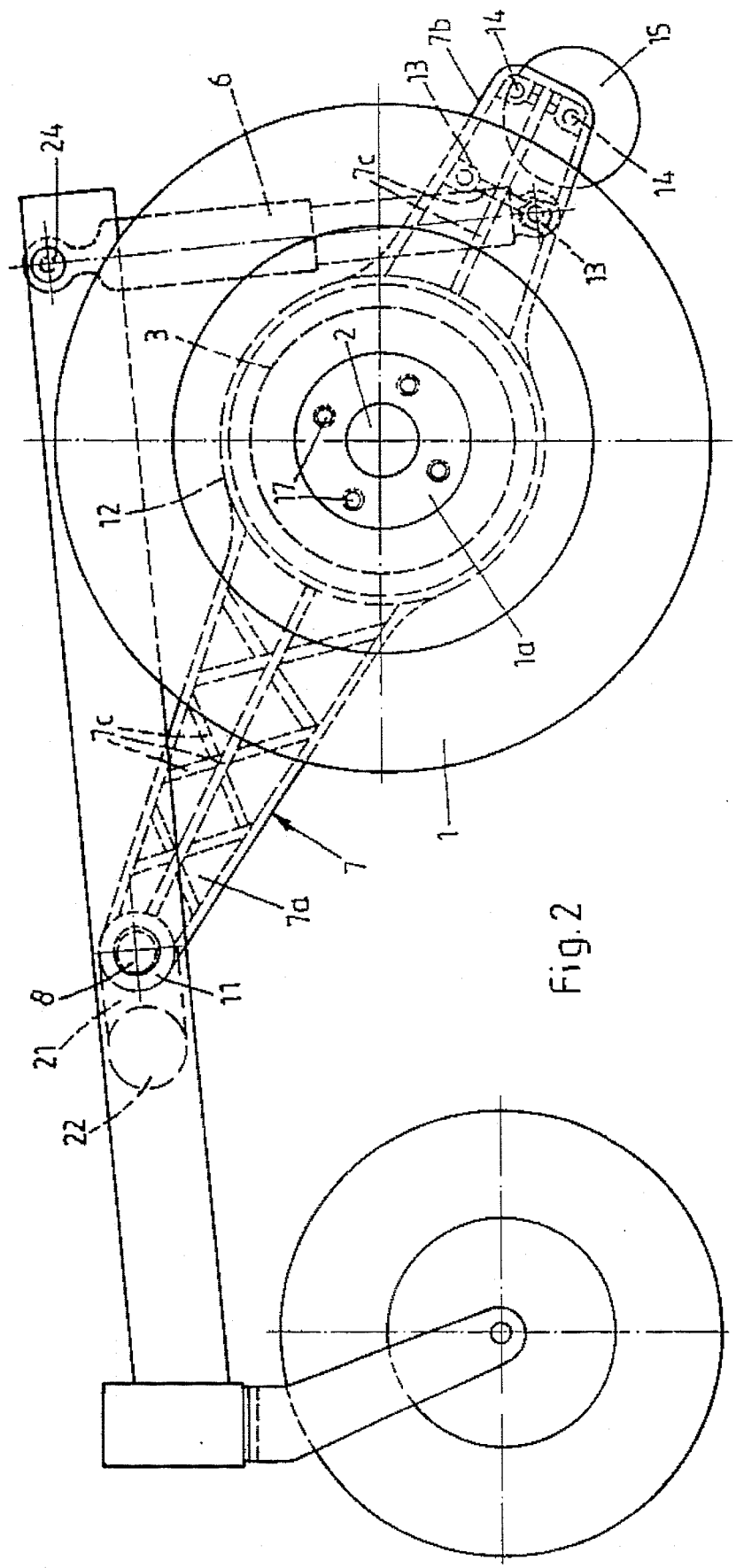
FIG. 2 is a detailed elevational view of the side of the wheelchair, showing the rocker pivotally mounted on the transverse bar of the underframe and shock absorber.
Figure 3:
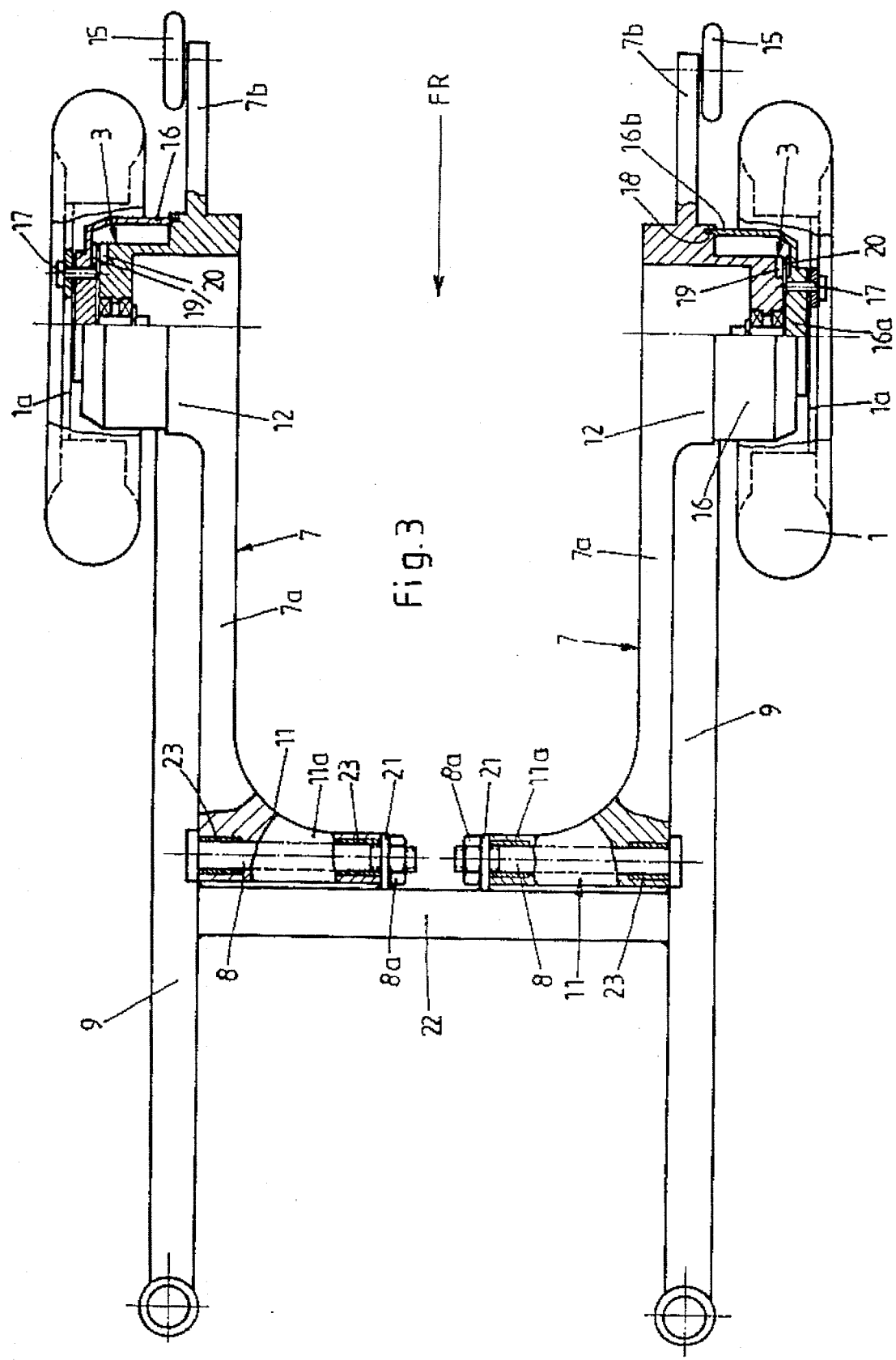
FIG. 3 is a plan view in partial cross section of the rockers, including the drives engaging the rims of the rear wheel.

Still referring to FIG. 1, and also to FIGS. 2–4, a rocker 7 is identically configured for use on the right and left. This rocker is mounted in the direction of travel (F) with its front longitudinal end in a horizontal axis (8) in a longitudinal bar (9) of the underframe so as to be pivotable with respect to height. And with its rear longitudinal end it is supported on the underframe longitudinal bar (9) and the spring member (6) coupled to rocker (7). Between the two rockers (7) a free space (FR) extending from the rear of the wheelchair to the pivoting rocker axes (8) is formed. A battery (10) may be advantageously arranged in the prone position at the center of gravity of the wheelchair.

The rocker (7) is configured of a one-piece, longitudinally extending aluminum body, which is reinforced by ribs (7c), and has a pot or flange-like holder (12) for the drive, from where rocker arms (7a, 7b) having different lengths and opposite one another extend on a straight line. The forward and longer rocker arm (7a), lies in the direction of travel (F) and serves as a bearing holder (11) for the pivoting axis (8); and the rear rocker arm (7b) lies in the direction of travel (F) and provided with two bearing holders (13) arranged one above the other for the alternate attachment of spring member (6). The rocker (7) may also be configured as a reinforced one-piece plastic body.

At the end of rear rocker arm (7b), at a distance from the bearing holders (13) for the spring member, the rocker (7) is additionally provided with two bearing holders (14) for attaching supporting wheel (15). The holes are arranged one above the other and used selectively depending upon whether the rocker 7 is installed on the right or the left side. For both the spring member (6) and for the supporting wheel (15), the lowermost of the pairs of bearing holders (13, 14) is used. As shown in the figures, the longitudinal length of spring (6) from the bearing holders (13, 14) to the longitudinal arm (9) is always greater than the radius of the rear wheel (1).

At the drive holder (12) for the rocker (7) a gearless electric drive motor (3) is disposed in the preferred embodiment. The motor 3 at least partly, and preferably completely, engages the rim (1a) of the rear wheel (1), and with its motor housing (16) is fastened at rim (1a) so as to be held in axial alignment in relation to the drive holder (12). The motor housing (16) is configured in the form of a pot. It connects the rim (1a) with the bottom of the pot (16a) and is rigidly connected with the rim (1a) by screws (17). At the edge of the pot (16b), the motor housing (16) engages an annular groove (18) of the bearing holder (12) and is guided in it during rotation.

The gearless motor (3) has a stator at the bearing holder (12) and a rotor (20) on housing (16). Each is configured as a flat coil which is supplied by the battery (10) by means of the rotor (20). Due to the rotor (20), the housing (16) including the rear wheel (1) is rotated in relation to the bearing holder (12) for the rocker (7) and as a result it is driven.

Alternatively, as shown in FIG. 4, at the drive holder (12) of the rocker (7) an electric motor (4) having an bevel gear set (4a) may be attached. The gear may be connected with the rear axle (2) of the rear wheel.

The rocker (7) extends backward and downward, obliquely inclined to the direction of travel (F).

As seen in FIG. 3, its front end the rocker (7) is configured as an angled bearing holder (11) including a bearing case (11a) which is disposed at right angles to the longitudinal direction of the rocker and is fastened by means of a screw bolt (8) as pivoting axis, to a bracket (21) of a transverse bar (22) connecting both longitudinal bars (9) on the underframe. A nut (8a) is screwed onto bolt 8. In bearing case (11a) flexible and/or elastic vibration dampers (23) such as plastic or rubber sleeves are attached around the screw bolt (8).

The rear longitudinal end of the rocker (7) is provided with two sleeves as bearing holders (13, 14) for the spring member or shock absorber (6) and the supporting wheel (15), with the spring member (6) and the supporting wheel (15) on the rear wheel (1) facing the side of the rocker arm (7b) being attached to the bearing holders (13, 14), respectively.

The spring member shock absorber (6) is mounted with its upper end in a horizontal articulated axle (24) on the longitudinal bar (9) of the underframe.

The foregoing description of the specific embodiments will so fully reveal the general nature of the invention that others can, by applying current knowledge, readily modify and/or adapt for various applications such specific embodiments, without departing from the generic concepts, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. A drivewheel apparatus on a wheelchair comprising, a pair of underframe longitudinal bars (9) respectively forming a first side and a second side of a frame of the wheelchair;

a pair of rockers (7) respectively engaged to each of said pair of longitudinal bars, each of said pair of rockers having a forward end and a rearward end, the forward end pivotally mounted on a horizontal pivot (8) fixed at a mid-section of each of said pair of longitudinal bars to permit vertical motion of each of said pair of rockers relative to said frame, a rear wheel (1) respectively rotatably mounted on each of said pair of rockers;

a rotor of an electric motor drive coupled to each said rear wheel;

a first end of a pair of spring members (6) respectively engaged at an end of each of said pair of longitudinal bars, a second end of said pair of spring members (6) respectively engaged at said rearward end of each of said pair of rockers such that said rearward end of each of said pair of rockers is supported by the spring member and each said rear wheel is spring mounted in relation to the wheelchair;

wherein each said rocker further comprises a one-piece, longitudinally extending aluminum body reinforced by ribs (7c), the body having a longer front rocker arm (7a) having a pivot bearing holder (11) rotatably engaged with the horizontal pivot (8); and a shorter rear rocker arm (7b) having a spring bearing holder (13) on an upper edge and a lower edge of said rocker to permit alternate use of said rocker on either said first side or said second side of said frame for attachment of the spring member;

the front rocker arm and the rear rocker arm extending opposite one another along a straight line from a drive holder (12) and integrally joined therewith;

wherein a free space is formed between each of said pair of rockers from a rear side of the wheelchair to the forward end of each of said pair of rockers.

2. The apparatus according to claim 1, wherein each of said pair of spring members (6) further comprises one of a shock absorber and a gas pressure spring.

3. The apparatus according to claim 1, wherein each said spring bearing holder (13) includes a bearing sleeve.

4. The apparatus according to claim 1, wherein the electric motor drive further comprises a gearless electric driving motor (3) mounted to the drive holder (12), the motor engaging a rim (1a) of the rear wheel (1), and including a motor housing (16) fastened rigidly at the rim to be axially rotatable in relation to the drive holder (12).

5. The apparatus according to claim 1, wherein the electric motor drive further comprises an electric driving motor (4) including an angle drive (4a) mounted to the drive holder (12) and connected to a drive axle (2) of the rear wheel.

6. The apparatus according to claim 1, wherein the rocker extends obliquely toward the rear and downward.

7. The apparatus according to claim 1, further comprising an underframe transverse bar (22) interconnecting said pair of longitudinal bars, wherein the forward end of each said rocker is configured as an angled bearing holder (11) disposed toward each other at right angles to the longitudinal extent of the rocker, each said bearing holder including a bearing sleeve (11a) and fastened to a bracket (21) of the transverse bar by means of a screw bolt (8) and mating nut (8a), the bolt acting as pivot pin.

8. The apparatus according to claim 7, having a flexible vibration damper (23) disposed around each said screw bolt (8).

9. The apparatus according to claim 8, wherein each said vibration damper includes a sleeve made selectively of plastic or rubber.

10. The apparatus according to claim 1 wherein the rocker (7), at a distance rearward from the spring bearing holder (13), includes a wheel bearing holder (14) on the upper edge and the lower edge of said rocker to permit alternate use of said rocker on either said first side or second side of said frame to attach a supporting wheel (15).

11. The apparatus according to claim 10, wherein each said wheel bearing holder (14) includes a bearing sleeve.

12. The apparatus according to claim 1, wherein the longitudinal length of spring (6) is greater than the radius of rear wheel (1).

\* \* \* \* \*